United States Patent
Hossain et al.

(10) Patent No.: US 11,683,206 B2
(45) Date of Patent: Jun. 20, 2023

(54) SYMBOL-RATE PHASE DETECTOR FOR MULTI-PAM RECEIVER

(71) Applicant: Rambus Inc., San Jose, CA (US)

(72) Inventors: Masum Hossain, Edmonton (CA); Nhat Nguyen, San Jose, CA (US); Charles Walter Boecker, Ames, IA (US)

(73) Assignee: Rambus Inc., San Jose, CA (US)

( * ) Notice: Subject to any disclaimer, the term of this patent is extended or adjusted under 35 U.S.C. 154(b) by 73 days.

(21) Appl. No.: 17/323,271

(22) Filed: May 18, 2021

(65) Prior Publication Data

US 2021/0344529 A1    Nov. 4, 2021

Related U.S. Application Data

(63) Continuation of application No. 16/847,793, filed on Apr. 14, 2020, now Pat. No. 11,038,725, which is a continuation of application No. 16/455,479, filed on Jun. 27, 2019, now Pat. No. 10,637,696.

(60) Provisional application No. 62/831,618, filed on Apr. 9, 2019, provisional application No. 62/693,271, filed on Jul. 2, 2018.

(51) Int. Cl.
*H04L 25/03* (2006.01)
*H04L 25/49* (2006.01)
*H04L 7/00* (2006.01)
*H04L 7/033* (2006.01)

(52) U.S. Cl.
CPC ........ *H04L 25/4917* (2013.01); *H04L 7/0058* (2013.01); *H04L 7/0331* (2013.01); *H04L 25/03057* (2013.01)

(58) Field of Classification Search
CPC .......... H04L 25/03057; H04L 25/4917; H04L 7/0062; H04L 7/0058; H04L 7/0331; H04L 25/03019
USPC .......................... 375/232–233, 316, 353, 371
See application file for complete search history.

(56) References Cited

U.S. PATENT DOCUMENTS

| | | | |
|---|---|---|---|
| 5,943,379 A | 8/1999 | Wong et al. | |
| 6,014,417 A | 1/2000 | Hee et al. | |
| 7,949,041 B2 | 5/2011 | Zerbe et al. | |
| 8,243,866 B2 | 8/2012 | Huang et al. | |
| 8,693,596 B1 | 4/2014 | Warner et al. | |
| 9,036,764 B1 | 5/2015 | Hossain et al. | |
| 9,209,966 B1 | 12/2015 | Hossain et al. | |
| 9,455,848 B1 * | 9/2016 | Zhang | H04L 25/03057 |

(Continued)

OTHER PUBLICATIONS

Hwang, In-Seok et al, "Optimization of Baud-Rate Timing Recovery for Equalization", IEEE Transactions on Communications, vol. 50, No. 4, Apr. 2002, pp. 550-552. 3 Pages.

(Continued)

*Primary Examiner* — Emmanuel Bayard
(74) *Attorney, Agent, or Firm* — Silicon Edge Law Group LLP; Arthur J. Behiel

(57) ABSTRACT

A multi-PAM equalizer receives an input signal distorted by inter-symbol interference (ISI) and expressing a series of symbols each representing one of four pulse amplitudes to convey two binary bits of data per symbol. High-order circuitry resolves the most-significant bit (MSB) of each two-bit symbol, whereas low-order circuitry 115 resolves the immediate least-significant bit (LSB). The MSB is used without the LSB for timing recovery and to calculate tap values for both MSB and LSB evaluation.

20 Claims, 6 Drawing Sheets

(56) References Cited

U.S. PATENT DOCUMENTS

| | | |
|---|---|---|
| 9,584,345 B1 | 2/2017 | Baecher et al. |
| 9,768,947 B2 | 9/2017 | Hossain et al. |
| 9,832,009 B2 | 11/2017 | Hossain et al. |
| 9,882,795 B1* | 1/2018 | Zhang .................. H04L 7/0087 |
| 9,954,489 B2 | 4/2018 | Hossain et al. |
| 10,050,771 B2 | 8/2018 | Hossain et al. |
| 10,091,036 B1 | 10/2018 | Hossain et al. |
| 10,135,647 B2 | 11/2018 | Zerbe et al. |
| 10,637,696 B2 | 4/2020 | Hossain et al. |
| 2004/0015773 A1 | 1/2004 | D'Arcy et al. |
| 2004/0208257 A1 | 10/2004 | Bessios et al. |
| 2005/0099325 A1 | 5/2005 | Bessios |
| 2005/0134305 A1 | 6/2005 | Stojanovic et al. |
| 2005/0135468 A1* | 6/2005 | Asuri ................. H03H 21/0012 375/232 |
| 2005/0185742 A1 | 8/2005 | Liu |
| 2007/0223634 A1 | 9/2007 | Haddad et al. |
| 2008/0069199 A1* | 3/2008 | Chen ..................... H04L 25/061 375/233 |
| 2010/0046683 A1* | 2/2010 | Beukema .............. H04L 7/0062 375/355 |
| 2011/0231741 A1 | 9/2011 | Chabot |
| 2011/0311008 A1 | 12/2011 | Slezak et al. |
| 2013/0322512 A1* | 12/2013 | Francese ........... H04L 25/03146 375/233 |
| 2014/0169442 A1 | 6/2014 | Hashida et al. |
| 2014/0286389 A1 | 9/2014 | Zerbe et al. |
| 2015/0085914 A1* | 3/2015 | Kizer ................ H04L 25/03885 375/233 |
| 2015/0215138 A1 | 7/2015 | Dorman et al. |
| 2016/0127155 A1* | 5/2016 | Johnson ............ H04L 25/03057 375/233 |
| 2016/0149730 A1 | 5/2016 | Navid |
| 2016/0191276 A1* | 6/2016 | Sakai ................ H04L 25/03057 375/233 |
| 2017/0317859 A1* | 11/2017 | Hormati ............ H04L 25/03949 |
| 2018/0227162 A1 | 8/2018 | Tokuhiro |
| 2019/0305991 A1* | 10/2019 | Tajalli ............... H04L 25/03038 |
| 2020/0007379 A1* | 1/2020 | Patil ........................ H04L 27/06 |

OTHER PUBLICATIONS

Kewley, Glenn, "12.5 Gbit/sec Serial Link", Technical Report No. UCB/EECS-2018-59, http://www2.eecs.berkeley.edu/Publs/TechRpts/2018/EECS-2018-59.html, Electrical Engineering and Computer Sciences University of California at Berkeley, May 11, 2018. 14 Pages.

Mueller, Kurt H. et al., "Timing Recovery in Digital Synchronous Data Receivers", IEEE Transactions on Communications, vol. COM-27, No. 5, May 1976, pp. 516-531. 16 Pages.

Musa, Faisal A., "High-Speed Baud-Rate Clock Recovery", A thesis submitted in conformity with the requirements for the degree of Doctor of Philosophy Graduate Department of Electrical and Computer Engineering University of Toronto, 2008. 141 Pages.

* cited by examiner

SYMBOL-RATE PHASE DETECTOR FOR MULTI-PAM RECEIVER

BACKGROUND

Binary communication systems represent information using just two symbols—e.g. relatively high and low voltages—to alternatively represent a logical one and a logical zero (i.e. 1b or 0b, where "b" is for binary). The number of levels used to represent digital data is not limited to two, however. For example, a type of signaling referred to as PAM-4 (for 4-level pulse-amplitude modulation) uses four separate pulse amplitudes (voltages) to convey two binary bits of data per symbol (i.e., 00b, 01b, 10b, or 11b). A series of symbols can thus be communicated as a voltage signal that transitions between levels in a manner that reflects the series. The time each voltage level is held to represent a symbol is termed the "symbol duration time" or "unit interval." The speed with which symbols can be communicated is termed the "symbol rate," which can be expressed in units of symbols per second, or "baud." A receiver recovers a set of symbols from a signal by comparing the voltage during each symbol time against one or more reference-voltage levels to distinguish between symbols.

High-performance communication channels suffer from many effects that degrade symbols and consequently render them difficult to resolve. Primary among them are frequency dependent channel loss (dispersion) and reflections from impedance discontinuities. These effects cause neighboring symbols to interfere with one another and are commonly referred to collectively as Inter-Symbol Interference (ISI). For example, neighboring relatively high-voltage symbols may spread out to raise the level of neighboring lower-voltage symbols; the lower-voltage symbols may be interpreted incorrectly. Lower-voltage symbols may likewise induce errors in neighboring higher-voltage symbols.

ISI becomes more pronounced at higher symbol rates, ultimately degrading signal quality such that distinctions between originally transmitted symbols may be lost. Some receivers mitigate the effects of ISI using one or more equalizers. One common type of equalizer, the decision-feedback equalizer (DFE), corrects for ISI imposed on a "victim" symbol by a neighboring "aggressor" symbol by multiplying the value of the aggressor symbol by a "tap value" calibrated to account for the ISI and subtracting the resultant corrective from the victim's signal level. Thus, for example, ISI from a prior symbol that tends to raise or lower the level of the immediate symbol is offset by a similar and opposite change to the immediate symbol level, or by a similar offset in the reference against which the immediate symbol is interpreted.

Unfortunately, calibrating and maintaining a sufficient number of signal offsets or reference levels can be daunting. In a PAM-4 system, for example, each symbol is evaluated against three reference levels that collectively change depending upon the value of the preceding symbols. A one-tap DFE therefore provides twelve calibrated offsets or twelve calibrated reference levels to manage the impact of ISI. The requisite circuitry is complex, area intensive, and power hungry.

ISI calibration is but one difficulty. Sample timing is also critical, particularly at high symbols rates. Typically, a clock and data recovery (CDR) circuit aligns edges of a sampling clock signal with incoming data symbols. CDRs detect phase errors between the clock and data symbols and adjust the clock to minimize the phase errors. Modern systems, such as multi-chip modules, include large numbers of high-speed channels that require independent timing control. Power, area, and latency are therefore critical.

BRIEF DESCRIPTION OF THE DRAWINGS

The detailed description is illustrated by way of example, and not by way of limitation, in the figures of the accompanying drawings and in which like reference numerals refer to similar elements and in which.

DETAILED DESCRIPTION

Figure 1:
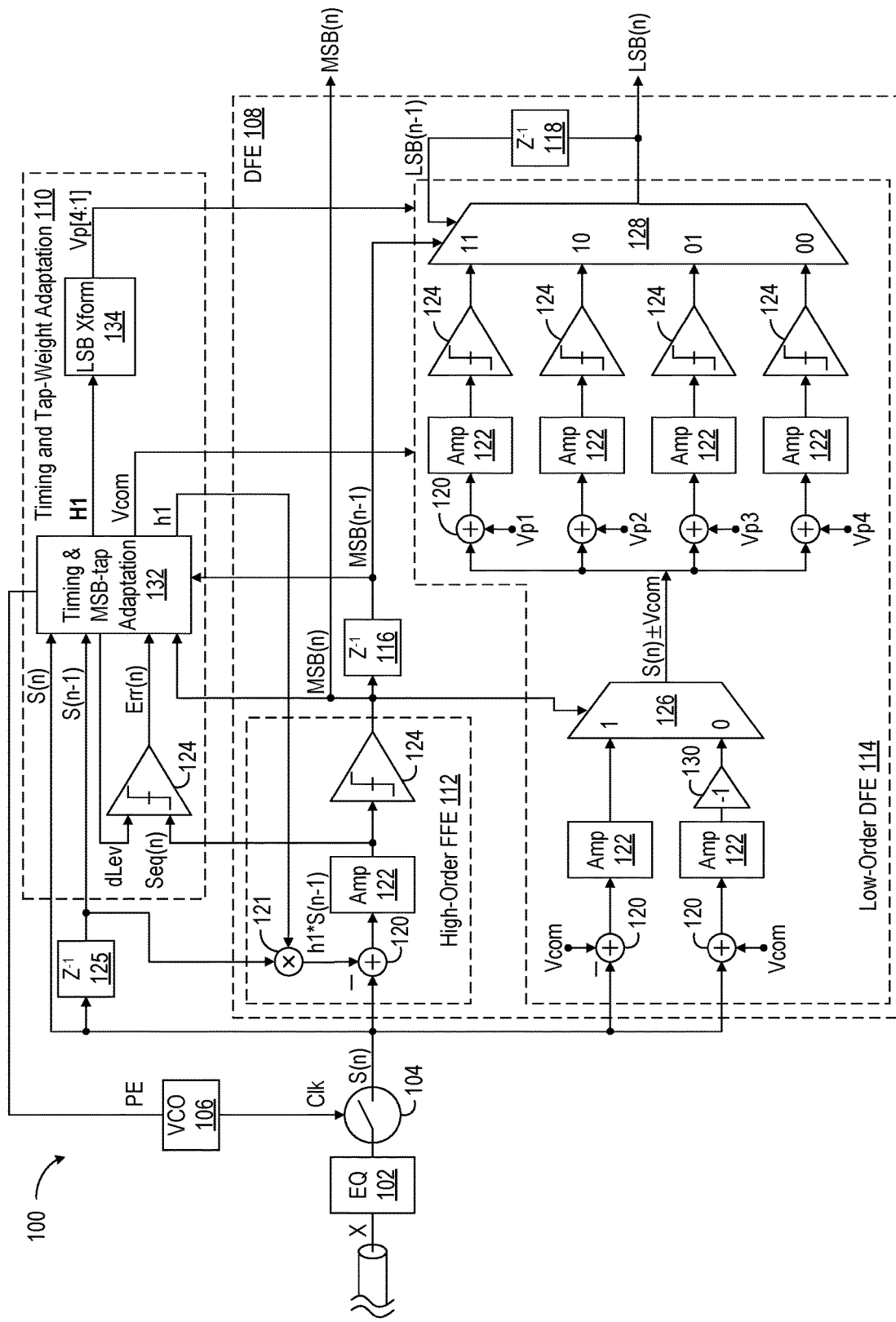
FIG. 1 depicts a receiver 100 that digitizes an input signal X distorted by inter-symbol interference (ISI) and expressing a series of symbols each representing one of four pulse amplitudes (voltages) to convey two binary bits of data per symbol.

FIG. 1 depicts a receiver 100 that digitizes an input signal X distorted by inter-symbol interference (ISI) and expressing a series of symbols each representing one of four pulse amplitudes (voltages) to convey two binary bits of data per symbol. The digitized output is represented as a pair of concurrent bits MSB(n) and LSB(n). A passive equalizer 102 equalizes signal X and conveys the equalized signal S(n) to an analog switch 104 timed via a symbol-rate clock signal Clk from a voltage-controlled oscillator (VCO) 106. The resultant analog immediate-symbol value, sample S(n), is conveyed to a DFE 108 and an adaptation block 110, the latter of which derives equalizer tap values for DFE 108 and provides a phase-error signal PE to VCO 106. Adaptation block 110 advantageously derives tap values and the phase-error signal without considering LSB data values, and thus without the device area and power required for such consideration.

DFE 108 includes high-order circuitry 112 and low-order circuitry 114. In this PAM-4 embodiment, high-order circuitry 112 resolves the most-significant bit (MSB) of each two-bit symbol as the high-order bit, whereas low-order circuitry 114 resolves the least-significant bit (LSB) as the low-order bit. A pair of unit delay elements 116 and 118 provides the MSB and LSB of a prior symbol as MSB(n−1) and LSB(n−1) for decision feedback.

High-order circuitry 112 includes an analog arithmetic element 120, a multiplier 121, an amplifier 122, and a sampler 124. An analog, one-unit delay element 125 applies an analog prior-symbol value, prior sample S(n−1), to multiplier 121, which multiplies the prior sample by an MSB tap value h1. Arithmetic element 120 subtracts the product from the current sample S(n). In this embodiment each analog arithmetic element 120 is e.g. a current digital-to-analog converter (DAC) that injects an offset current into the signal path to compensate for post-cursor ISI. Amplifier 122 amplifies the resultant analog signal as equalized analog signal Seq(n). Sampler 124 samples signal Seq(n) as immediate decision MSB(n), the MSB of the current symbol. Immediate MSB(n) and prior decision MSB(n−1) are conveyed to adaptation block 110 for use in timing recovery.

Low-order circuitry 114 extracts the low-order bit of each incoming symbol of equalized signal S(n). Low-order circuitry 114 offsets incoming symbols S(n) by two sets of four levels. A first multiplexer 126 employs the immediate most-significant bit MSB(n) from high-order circuitry 112 to select the amplified output from one of two elements 120 that offset the equalized input signal by plus and minus Vcom, where Vcom is a common-mode voltage offset attributed to the immediate level of the most-significant bit. A pair of analog amplifiers 122 amplifies these offset signals and presents them to first multiplexer 126, which selects one of the offset immediate symbol values S(n)+Vcom and S(n)−Vcom. The lowermost amplifier 122 to multiplexer 126 inverts the sense of the incoming Vcom-offset signal, a function illustrated schematically as an inverting element 130. Inverting one of the input signals to multiplexer 126 aligns the shapes of symbol eyes associated with the LSB to increase the overall eye opening. The benefit of this approach is discussed further below in connection with an eye diagram 215 of FIG. 2.

The offset immediate symbol S(n)±Vcom selected by multiplexer 126 is further offset by four voltage levels Vp[4:1], one for each of the four possible values expressed by the prior symbol. These four offset signals are sampled relative to e.g. zero by corresponding samplers 124. A second multiplexer 128 employs the prior most-significant bit MSB(n−1) and the prior least-significant bit LSB(n−1) to select the immediate least-significant bit LSB(n) from the selected sampler. Delay element 118 delays the output from multiplexer 128 by one symbol time to output prior least-significant bit LSB(n−1). As in high-order circuitry 112, each analog arithmetic element 120 can be e.g. a current DAC that injects an offset current into the signal path to raise or lower the signal voltage to compensate for pre-cursor ISI. A set of amplifiers 122 amplifies the four analog symbols offset by ±Vcom and one of levels Vp[4:1].

The following Table 1 illustrates the offsets applied to the signal paths of low-order circuitry 114 of DFE 108 of FIG. 1 in evaluating the LSB. Each sampler 124 is assumed to sample its respective differential input relative to zero. The four offsets, LSB taps Vp[4:1], are a considerable simplification over the twelve required for a loop-unrolled DFE, three decision levels for each of four possible values of the preceding symbol. Each value Vp[4:1] is an arithmetic combination of calibrated ISI offsets hMSB and hLSB attributable to respective prior sample values MSB(n−1) and LSB(n−1).

Multiplexer 128 then selects one of four samplers 124 based on the values MSB(n−1) and LSB(n−1) representative of the prior symbol. With reference to the first line of Table 1, for example, if immediate MSB(n) is 1b—regardless of the value of immediate decision LSB(n)—and prior decisions MSB(n−1) and LSB(n−1) are 11b, then multiplexer 126 conveys the input signal reduced by Vcom (S(n)−Vcom) and multiplexer 128 selects the output from the sampler 124 that samples signal S(n)−Vcom further offset by level Vp1 to compensate for impacts of the prior symbol represented by MSB(n−1) and LSB(n−1). The applied offsets place their respective signals within or nearer to the linear regions of amplifiers 122 and thus improve the linearity of DFE 108.

Adaptation block 110 includes a sampler 124 that produces an error signal Err, a timing recovery and MSB-tap adaptation circuit 132, and an LSB transform block 134. Power consumption is an important metric, particularly for low-loss channels of the type found in multi-chip modules. Adaptation block 110 performs tap-weight and timing adaptation based on MSB values alone, which reduces the requisite circuitry and concomitant power consumption.

Data level dLev is the voltage separating the analog MSB value from the LSB value. Adaptation circuit 132 derives data level dLev using e.g. a well-known algorithm known as sign-sign least-mean-squared (SSLMS). The same SSLMS algorithm employs samples MSB samples MSB(n) to derive MSB filter tap value h1 and an MSB tap matrix H1 that is a measure of the channel response derived without LSB consideration and associated circuitry and power consumption. For a detailed treatment of an SSLMS algorithm see U.S. Pat. No. 10,135,647 to Zerbe et al, which is incorporated herein by reference.

Matrix H1 estimates the channel response. LSB transform block 134 performs a linear transformation of matrix H1 to derive LSB filter tap values Vp[4:1]. A linear transform serves, in part, because low-order DFE 114 adds and subtracts Vcom to place the signal eye used for LSB sampling in the linear ranges of the four amplifiers 122 from which the LSB-tap-offset samples are taken. LSB tap values are thus derived without reference to LSB values and the circuitry and power that would otherwise be required for LSB consideration.

Figure 2:
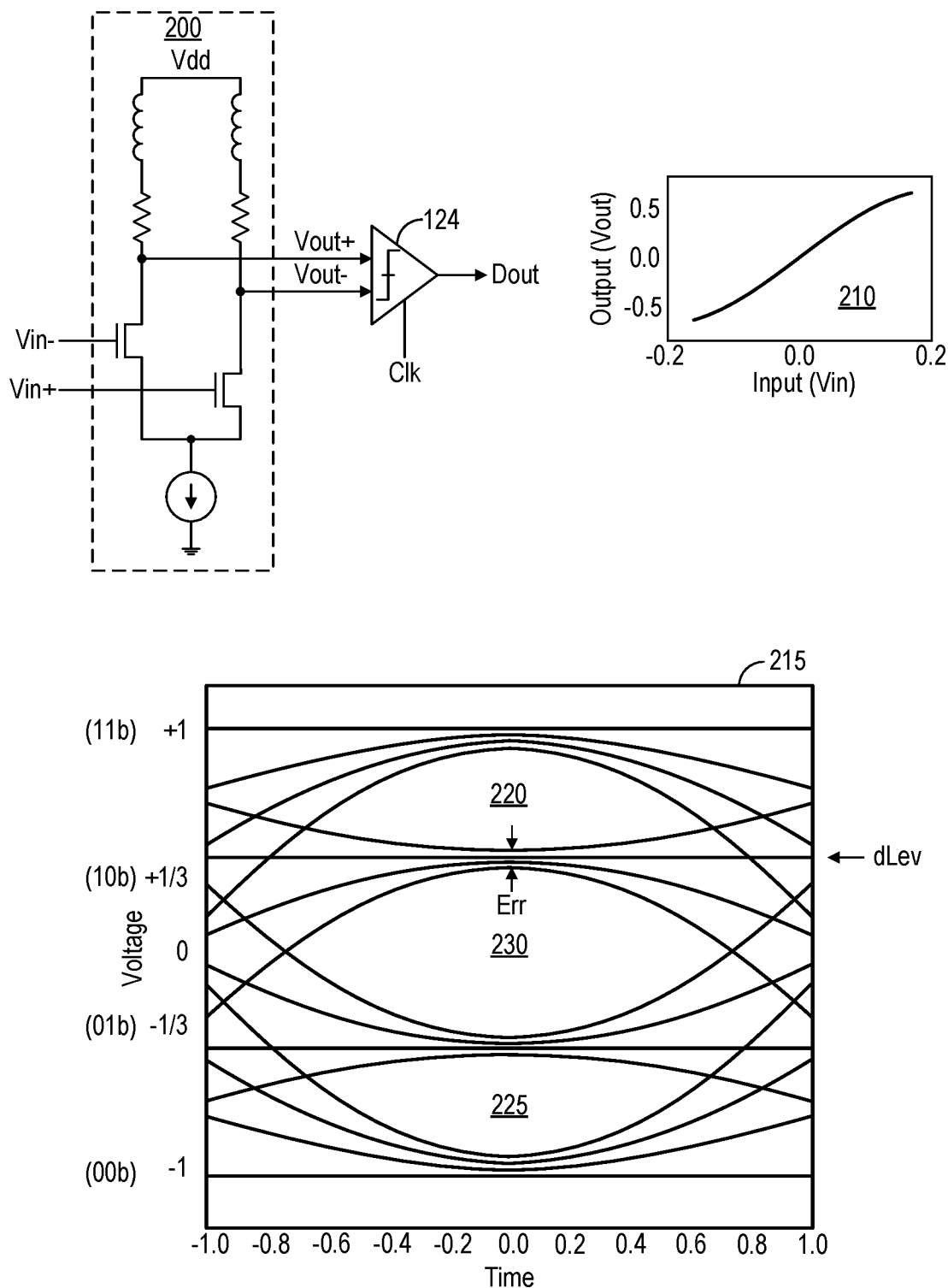
FIG. 2 (prior art) schematically depicts a differential amplifier 200 that can be employed as amplifiers 122 of FIG. 1.

FIG. 2 (prior art) schematically depicts a differential amplifier 200 that can be employed as amplifiers 122 of FIG. 1. Amplifier 200 amplifies the difference between differential input nodes Vin− and Vin+ to present the output differentially across output nodes Vout+ and Vout−. A sampler 124 produces an output decision Dout representative of a binary

TABLE 1

| Ref | Immediate Symbol (MSB(n)/LSB(n)) | Prior Symbol (MSB(n − 1)/LSB(n − 1)) | | Offset (w/ 1 tap) | |
| --- | --- | --- | --- | --- | --- |
| 0 Volts | +1, +1/3 (11b, 10b) | +1 (11b) | −Vcom | Vp1 | = −hMSB − hLSB |
| | | +1/3 (10b) | −Vcom | Vp2 | = −hMSB + hLSB |
| | | −1/3 (01b) | −Vcom | Vp3 | = hMSB − hLSB |
| | | −1 (00b) | −Vcom | Vp4 | = hMSB + hLSB |
| | −1, −1/3 (00b, 01b) | +1 (11b) | Vcom | Vp1 | = −hMSB − hLSB |
| | | +1/3 (10b) | Vcom | Vp2 | = −hMSB + hLSB |
| | | −1/3 (01b) | Vcom | Vp3 | = hMSB − hLSB |
| | | −1 (00b) | Vcom | Vp4 | = hMSB + hLSB |

Returning to FIG. 1, multiplexer 126 passes input signal S(n) offset by plus or minus Vcom based on the immediate value of MSB(n) as detected by high-order circuitry 110.

one or zero based on the relative levels of output signals Vout+ and Vout− on edges of a clock signal Clk. Offsets of the type illustrated in FIG. 1 can be applied to either or both input nodes. Applying a positive offset to input node Vin– is like applying a negative offset of the same magnitude, for example.

A diagram 210 is included to illustrate a problem of nonlinearity as applied to amplifier 200, and thus DFE 108 more generally. A circuit is called "linear" if the output is a linear function of its inputs. For a voltage amplifier of the type employed by amplifier 200, linearity means that the gain does not change with input voltage. Unfortunately, linear gain is difficult to obtain, particularly for high-speed circuits. Thus, different input voltages are subject to different levels of amplification and output signals are consequently distorted. In the example of diagram 210 gain is relatively linear in the middle of the input voltage range, becoming less linear toward the high and low regions. In a 900 mV system, for example, the linear output range might be limited to about 450 mV peak-to-peak.

An eye diagram 215 for an illustrative PAM-4 signal relates the voltage of incoming symbols normalized between +1 and –1 with eyes 220, 225, and 230 separating signal levels that correspond to the binary values 11b, 10b, 01b, and 00b. The voltage range is bounded by a 900 mV supply in one embodiment. The relatively high and low eyes 220 and 225 are smaller (more closed) than the central eye 230. Low-order DFE 114 of DFE 108 in FIG. 1 compensates for this nonlinearity by moving the input signal toward the linear ranges of the various amplifiers 122 in the signal paths.

Each of eyes 220 and 225 tends to be a horizontally asymmetrical mirror image of the other. With reference to FIG. 1, inverting one of the Vcom-shifted signals to multiplexer 126 aligns the shapes of eyes 220 and 225 to increase the overall eye opening for the LSB, and thus improves signaling performance. Signal inversion can be accomplished by e.g. reversing the sense of input nodes Vin– and Vin+ to amplifier 200.

Figure 3:
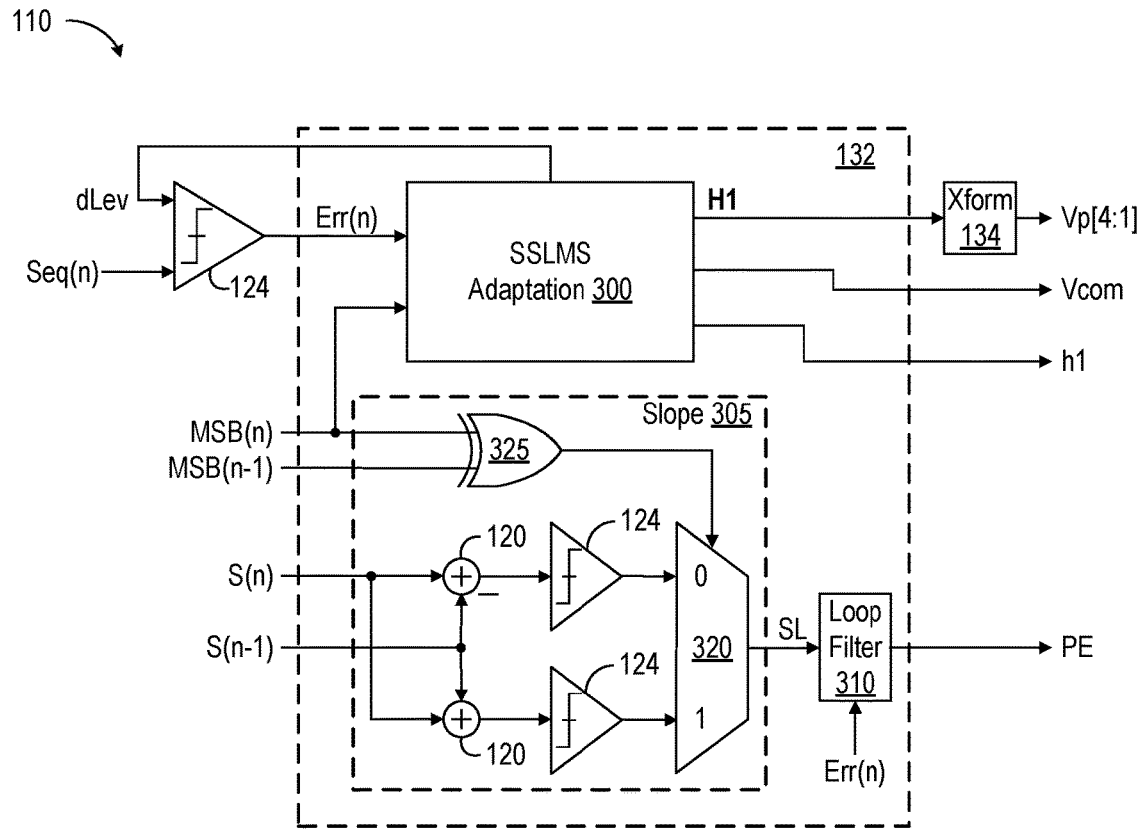
FIG. 3 depicts an embodiment of adaptation block 110 of FIG. 1.
Figure 3:
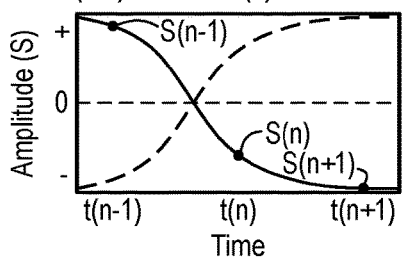

FIG. 3 depicts an embodiment of adaptation block 110 of FIG. 1. Timing and tap adaptation circuit includes an SSLMS adaption block 300, a slope detector 305, and a digital loop filter 310. FIG. 3 also includes, at bottom left, a simple timing diagram 330 illustrating an incoming differential signal. Solid and dashed lines trace complementary analog paths expressing the binary pattern 100b. That is, decisions MSB(n–1:n+1)=100b. Finally, FIG. 3 includes, at bottom right, a table 335 illustrating how timing errors can be selected from pre-computed analog comparisons using MSB values.

SSLMS adaptation block 300 functions as noted previously, in connection with FIG. 1, to derive tap weights, data level dLev, and common-mode voltage Vcom without LSB consideration. Slope detector 305 and digital loop filter 310 generate a filtered error signal, phase-error signal PE, that controls VCO 106 (FIG. 1), and thus symbol-rate sample timing for receiver 100.

Slope detector 305, loop filter 310, and sampler 124 generate a phases error PE using a process commonly referred to as "Mueller-Müller phase detection." Slope detector 305 includes a pair of arithmetic elements 120 that provide the sum of and difference between analog samples S(n) and S(n–1) to a pair of samplers 124. A multiplexer 320 selects between the sum and difference based upon immediate and prior MSB decisions MSB(n) and MSB(n–1) to indicate the slope SL of the incoming signal. An XOR gate 325 selects the sum if the decisions are different and the difference if the decisions are the same.

Symbols S(n–1) and S(n) are the previous and current sampled analog values of the received signal; symbols MSB(n–1) and MSB(n) are the previous and current binary MSB decision values. Using decisions creates a challenge because the analog values are held until equalization decisions are made. Pre-computing slope is beneficial in that it allows decisions to be stored in the digital domain.

With reference to diagram 330, the absolute value of symbol S(n–1) is greater than the absolute value of symbol S(n). The error function for phase adjustments minimizes the sum S(n)+S(n–1) when MSB(n) and MSB(n–1) are different. Considering times t(n) and t(n+1), the analog value S(n) is less negative than value S(n) despite their common representation of an MSB of –1 (i.e., MSB(n)=MSB(n+1) =–1). The error function for phase adjustments minimizes the difference S(n)–S(n–1) when MSB(n) and MSB(n–1) are the same.

Table 335 tabulates how slope detector 305 can be employed to detect timing errors as a function of adjacent MSB symbols MSB(n) and MSB(n–1) and the analog sums and differences between symbols S(n) and S(n–1). The error entries are factored to show that the error is a function of the sums and differences of S(n) and S(n–1) provided by slope detector 305 multiplied by the corresponding values of MSB(n). Phase error PE is the product of error signal Err(n) and sign of the difference S(n)–S(n–1). Slope SL from slope detector 305 can therefore be multiplied by error signal Err(n) to produce phase error signal PE. This multiplication occurs within loop filter 310, which also acts as a conventional digital loop filter to stabilize and adjust clock signal Clk via VCO 106 (FIG. 1).

Figure 4:
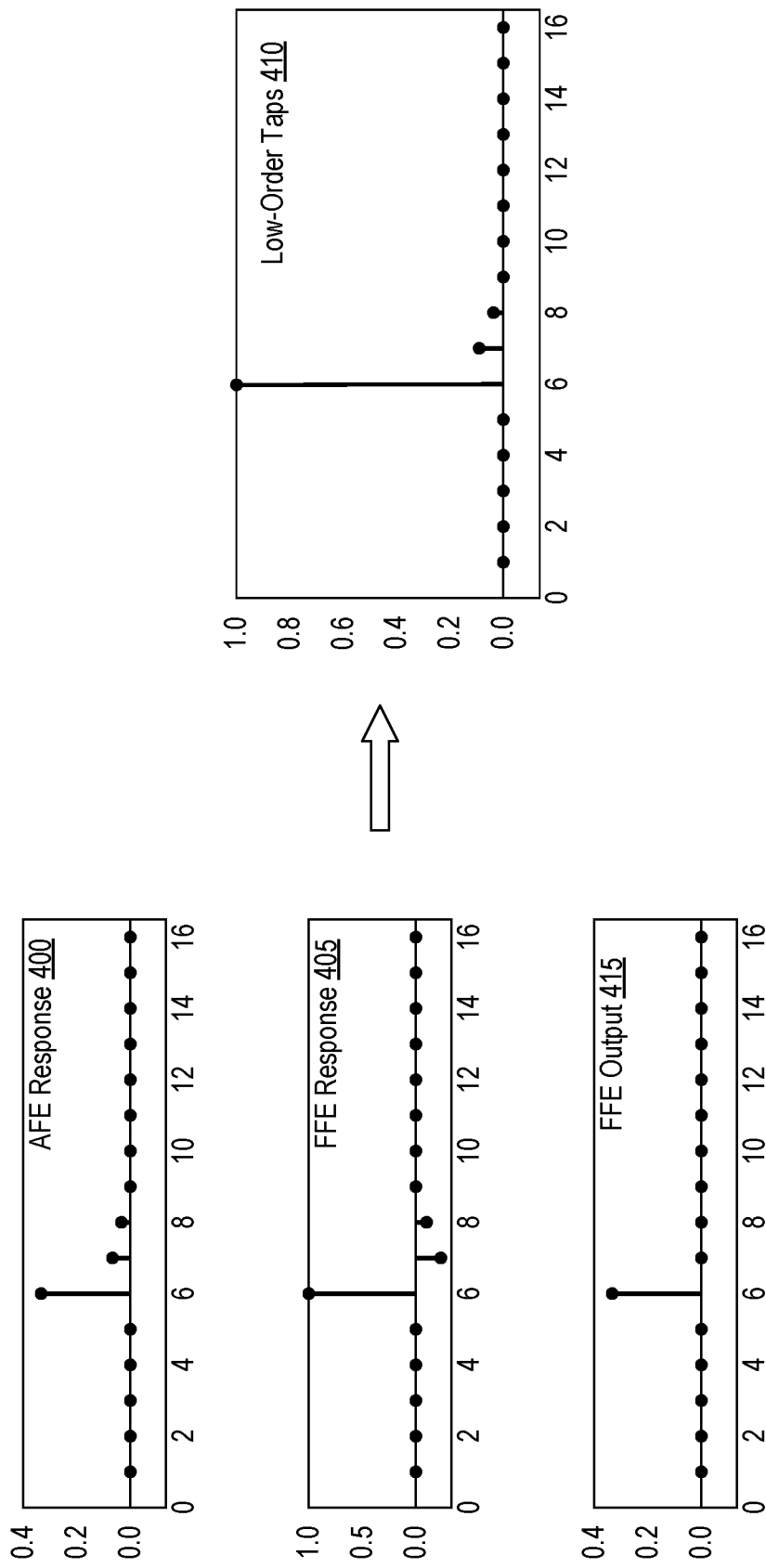
FIG. 4 shows an impulse response 400 for equalizer 102 showing ISI at times T7 and T8.

FIG. 4 shows an impulse response 400 for equalizer 102 showing ISI at times T7 and T8. Equalizer 102 can be an analog front end that provides gain and high-frequency boost, though gain can be limited to zero with a passive equalizer. A second impulse response 405 for FFE 112, generated by e.g. LMS adaptation for MSB detection, represents matrix H1, an inverted version of the channel impulse response 400 derived without reference to the LSB values of the incoming signal. Response 405 includes measures of channel characteristics beyond tap h1 employed by FFE 112. LSB transform block 134 performs a linear transformation of the full set of information represented by matrix H1 to derive LSB taps Vp[4:1], which are represented by a third impulse response 410 used for LSB detection by e.g. low-order DFE 114. A fourth response 415 represents the equalized output of FFE 112.

Figure 5:
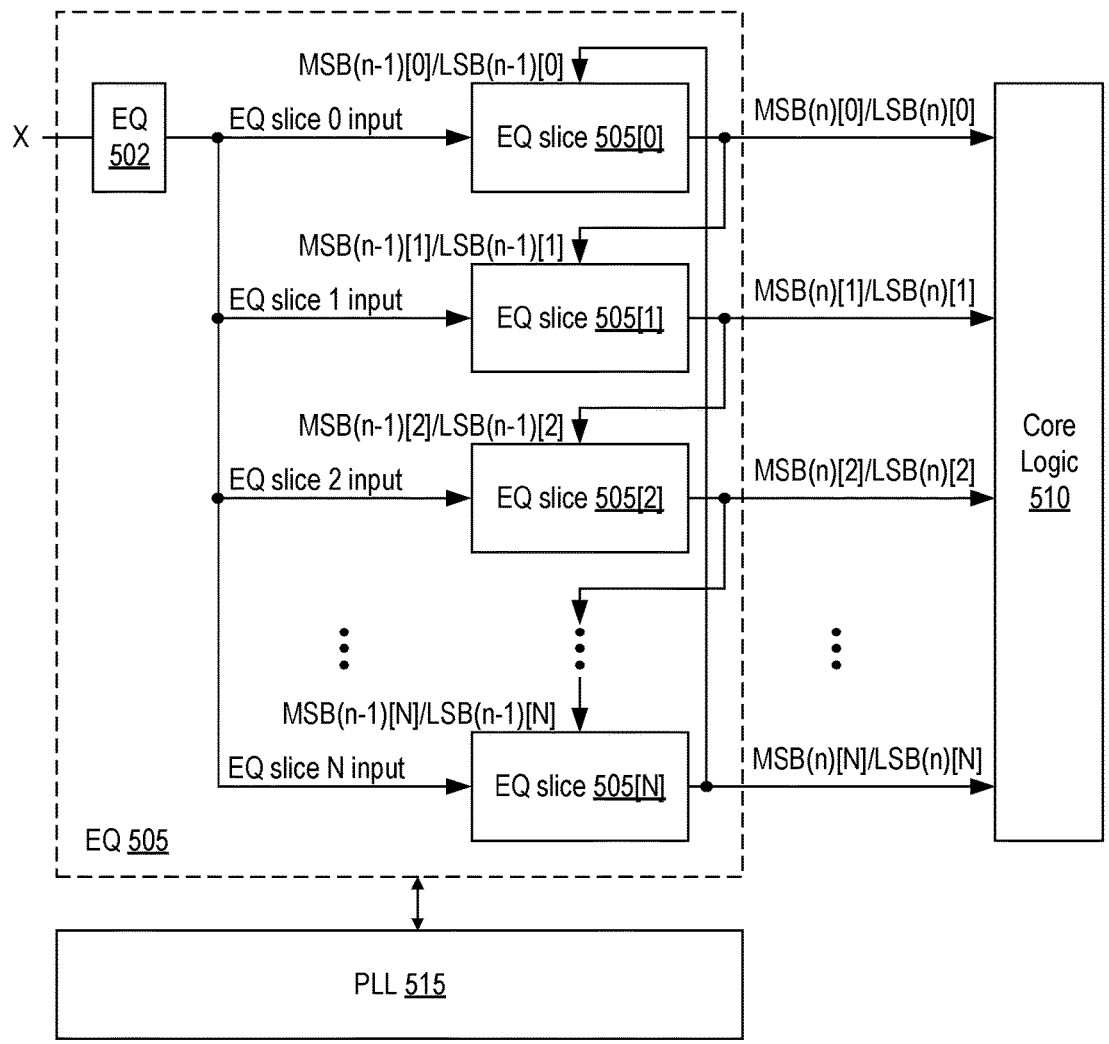
FIG. 5 depicts an integrated circuit 500 that incorporates passive equalizer 102 of FIG. 1, an equalizer (EQ) 505, and some core logic 510 that makes use of the data digitized by EQ 505.

FIG. 5 depicts an integrated circuit 500 with passive equalizer 502, active equalizer 505, a phase-locked loop 515 for extracting timing information from incoming signal X, and some core logic 510 that makes use of the data digitized by EQ 505. EQ 505 is divided into N+1 slices 505[N:0]. Each slice 505[#] can function in the manner of EQ 108 of FIG. 1 and operates at a symbol rate of 1/(N+1) times that of input signal X with a timing offset of one symbol time of input signal X relative to the neighboring slices. EQ slices 505[N:0] thus process input signal X in parallel to relax timing constraints on DFE 505. The number of slices is e.g. thirty-two (N=31) in this example.

ISI impacts temporally adjacent symbols in input signal X so each EQ slice 505[#] shares its output with the slice charged with resolving the immediately preceding symbol. Thus, the immediate-symbol values MSB(n)[0]/LSB(n)[0] for slice 505[0] are the prior-symbol values MSB(n–1)[1]/ LSB(n–1)[1] for slice 505[1]. Unit delay elements 116 and 118 of FIG. 1 may thus be omitted in multi-slice embodiments. Core logic 510 can be any circuitry that makes use of the digitized version of input signal X represented by signals MSB(n)[N:0]/LSB(n)[N:0]. A PLL 515 can be shared by all slices 505[N:0].

Figure 6:
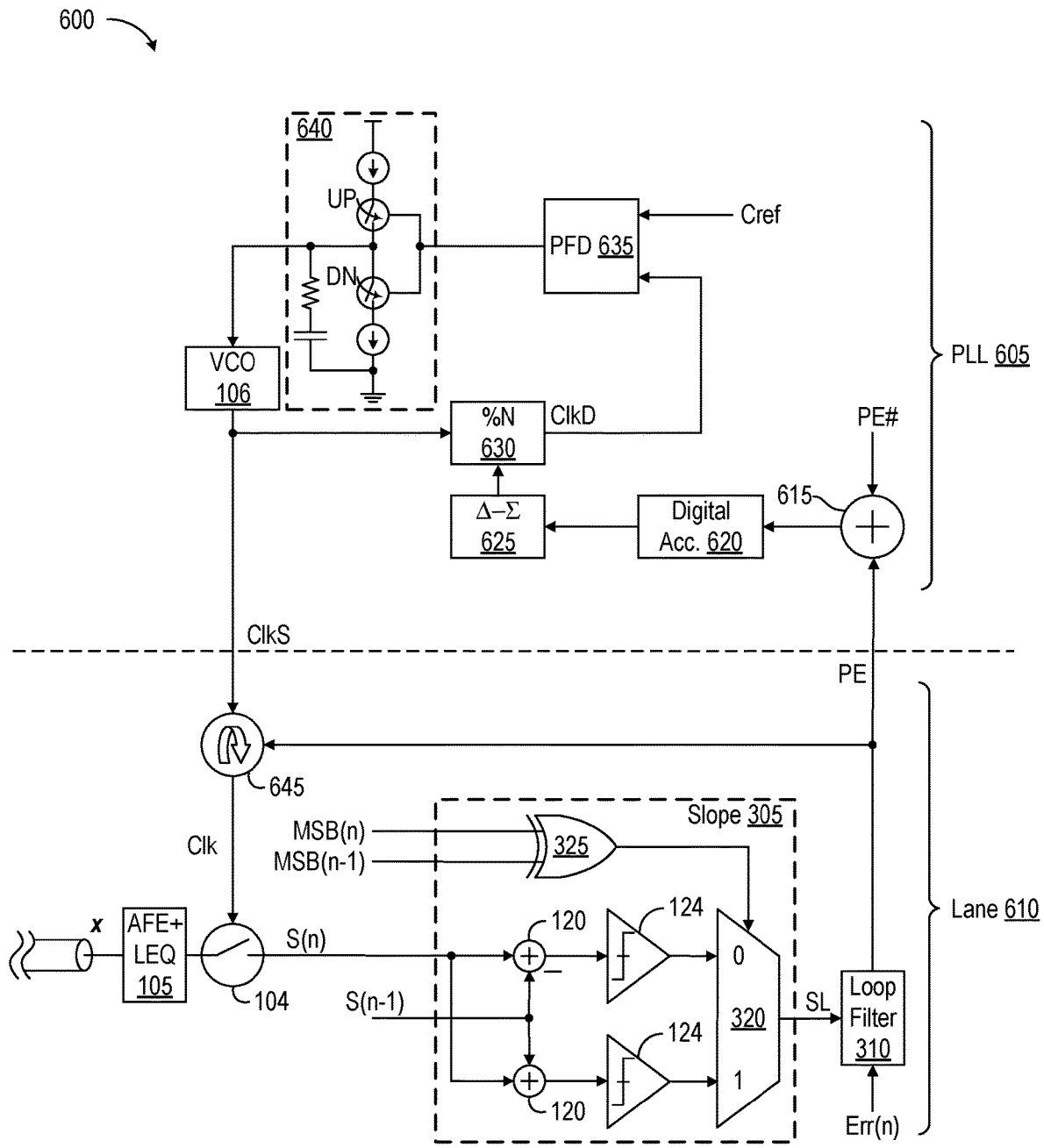
FIG. 6 depicts CDR circuitry 600 in accordance with one embodiment.

FIG. 6 depicts CDR circuitry 600 in accordance with one embodiment. CDR circuitry 600 includes a phase-locked loop (PLL) 605 and timing control circuitry from one lane 610 of a multi-lane receiver. Elements of lane 610 are as detailed previously with like-identified elements being the same or similar. Though not shown, lanes similar to lane 610 generate their own phase-error signals PE #, which PLL 605 sums with phase-error signal PE from lane 610 using a summing element 615.

The output of summing element 615, a sum or instantaneous average of the phase-error signals, is applied to a digital accumulator 620 that integrates the combination of feedback signals and provides the result to a Delta-Sigma modulator 625. Delta-Sigma modulator 625 controls a fractional N divider 630 that matches the frequencies of a system-wide clock signal ClkS from VCO 106 and a slower reference clock signal Cref. The resultant divided clock signal ClkD is applied with reference clock signal Cref to a phase and frequency detector 635 that drives the output of divider 630 to match clock signal Cref by adjusting the operation of a charge pump 640 that delivers a control voltage to VCO 106.

VCO 106 is controlled to generate a frequency of oscillation that closely tracks the average frequency of the incoming data signals. Phase error signal PE from local loop filter 310 is applied to a phase rotator 645 to make lane-specific sample-phase adjustments to clock signal Clk. Shared PLL 605 reduces the size of the phase increments needed in the individual local clock recovery circuits (e.g. within lane 610) at each update time, and thus saves overall area, power, and complexity required for timing recovery and control. The local loop can be fixed or periodically updated after convergence to save power.

In the foregoing description and in the accompanying drawings, specific terminology and drawing symbols are set forth to provide a thorough understanding of the present invention. In some instances, the terminology and symbols may imply specific details that are not required to practice the invention. For example, the interconnection between circuit elements or circuit blocks may be shown or described as multi-conductor or single conductor signal lines. Each of the multi-conductor signal lines may alternatively be single-conductor signal lines, and each of the single-conductor signal lines may alternatively be multi-conductor signal lines. Signals and signaling paths shown or described as being single-ended may also be differential, and vice-versa. Similarly, signals described or depicted as having active-high or active-low logic levels may have opposite logic levels in alternative embodiments.

An output of a process for designing an integrated circuit, or a portion of an integrated circuit, comprising one or more of the circuits described herein may be a computer-readable medium. The computer-readable medium may be encoded with data structures or other information describing circuitry that may be physically instantiated as an integrated circuit or portion of an integrated circuit. Various formats may be used for such encoding. Those of skill in the art of integrated circuit design can develop such data structures from schematic diagrams of the type detailed above and the corresponding descriptions and encode the data structures on computer readable medium. Those of skill in the art of integrated circuit fabrication can use such encoded data to fabricate integrated circuits comprising one or more of the circuits described herein.

While the subject matter has been described in connection with specific embodiments, other embodiments are also envisioned. For example, offsets for some or all the speculative feedback can be applied to references against which the data-carrying signals are measured, or to both data-carrying signals and their corresponding references. DFEs of the type detailed herein can be adapted for multi-PAM signal recovery beyond four levels, for example. Therefore, the spirit and scope of the appended claims should not be limited to the foregoing description. Only those claims specifically reciting "means for" or "step for" should be construed in the manner required under the sixth paragraph of 35 U.S.C. § 112.

What is claimed is:

1. A receiver for digitizing an analog input signal expressing a series of symbols, the receiver comprising:
   an input node to receive the analog input signal expressing the series of symbols;
   a feed-forward equalizer coupled to the input node to equalize the series of symbols and sample the equalized series of symbols to produce digital samples of the series of symbols; and
   a second equalizer coupled to the input node to equalize the series of symbols, the second equalizer including:
      a first arithmetic element to provide a first voltage offset to the series of symbols to produce a first series of voltage-offset symbols;
      a second arithmetic element to provide a second voltage offset to the series of symbols to produce a second series of voltage-offset symbols; and
      a multiplexer to alternatively select between the symbols of the first series of voltage-offset symbols and the second series of voltage-offset symbols responsive to the digital samples of the series of symbols.

2. The receiver of claim 1, the second equalizer further including:
   a third arithmetic element to provide a third voltage-offset to the series of symbols from the multiplexer to produce a third series of voltage-offset symbols;
   a first sampler to provide digital samples of the third series of voltage-offset symbols;
   a fourth arithmetic element to provide a fourth offset to the series of symbols from the multiplexer to produce a fourth series of voltage-offset symbols;
   a second sampler to provide digital samples of the fourth series of voltage-offset symbols; and
   a second multiplexer to alternatively select between the digital samples of the third series of voltage-offset symbols and the fourth series of voltage-offset symbols responsive to the digital samples of the series of symbols from the feed-forward equalizer.

3. The receiver of claim 2, the second multiplexer to select between the digital samples of the third series of voltage-offset symbols and the fourth series of voltage-offset symbols responsive to the digital samples of the series of symbols and an output of the second multiplexer.

4. The receiver of claim 2, the second equalizer further including:
   a fifth arithmetic element to provide a fifth offset to the series of symbols from the multiplexer to produce a fifth series of voltage-offset symbols;
   a third sampler to provide digital samples of the fifth series of voltage-offset symbols;
   a sixth arithmetic element to provide a sixth offset to the series of symbols from the multiplexer to produce a sixth series of voltage-offset symbols;

a fourth sampler to provide digital samples of the fifth series of voltage-offset symbols; and the second multiplexer to alternatively select between the digital samples of the third series of voltage-offset symbols, the fourth series of voltage-offset symbols, the fifth series of voltage-offset symbols, and the sixth series of voltage-offset symbols responsive to the digital samples of the series of symbols from the feed-forward equalizer.

5. The receiver of claim 4, the series of symbols including an immediate symbol and a prior symbol preceding the immediate symbol, each of the series of symbols expressed over a symbol time and representing a most-significant bit (MSB) and a least-significant bit (LSB), the second multiplexer selecting between the digital samples of third, fourth, fifth, and sixth series of voltage-offset symbols responsive to the MSBs and the LSBs.

6. The receiver of claim 1, further comprising an adaptation circuit to derive the first offset and the second offset from the digital samples of the series of symbols from the feed-forward equalizer.

7. The receiver of claim 6, further comprising an error sampler to sample the equalized series of symbols to produce error samples, the adaptation circuit to derive the first offset and the second offset from the digital samples of the series of symbols from the feed-forward equalizer and the error samples.

8. The receiver of claim 1, further comprising an analog switch coupled to the input node to issue the series of symbols.

9. A method of digitizing an analog input signal expressing a series of symbols, the method comprising:

sampling the series of symbols to produce a series of analog samples;

equalizing the series of analog samples to produce a series of equalized analog samples;

sampling the series of equalized analog samples to produce a series of equalized digital samples;

applying a first offset to the series of analog samples to produce a first offset series of analog samples;

applying a second offset to the series of analog samples to produce a second offset series of analog samples; and selecting between ones of the first offset series of analog samples and ones of the second offset series of analog samples, responsive to the equalized digital samples, to produce a selected series of offset analog samples.

10. The method of claim 9, further comprising inverting the second offset series of analog samples.

11. The method of claim 9, further comprising:

applying third, fourth, fifth, and sixth offsets to the selected series of offset analog samples to produce respective third, fourth, fifth, and sixth series of offset analog samples;

sampling each of the third, fourth, fifth, and sixth series of offset analog samples to produce third, fourth, fifth, and sixth series of digital samples; and selecting between the third, fourth, fifth, and sixth series of digital samples responsive to the equalized digital samples.

12. The method of claim 9, further comprising deriving the first offset and the second offset from the series of equalized digital samples.

13. The method of claim 12, further comprising sampling the series of analog samples to produce error samples and deriving the first offset and the second offset from the error samples.

14. The method of claim 13, further comprising deriving a clock signal from the equalized digital samples and the error samples.

15. The method of claim 14, wherein sampling the series of symbols to produce the series of analog samples is responsive to the clock signals.

16. A receiver for digitizing an analog input signal expressing a series of symbols, the receiver comprising:

an analog sampler to sample the series of symbols to produce a series of analog samples;

means for equalizing the series of analog symbols to produce a series of equalized analog samples;

a digital sampler to sample the series of equalized analog samples to produce a series of equalized digital samples;

means for applying first and second voltage offsets to the series of analog symbols to produce respective first and second voltage-offset series of analog symbols; and means for selecting between ones of the first and second voltage-offset series of analog symbols responsive to the equalized digital samples to produce a selected series of voltage-offset analog symbols.

17. The receiver of claim 16, further comprising an inverting element to invert the second voltage-offset series of analog symbols.

18. The receiver of claim 16, further comprising:

means for applying third, fourth, fifth, and sixth offsets to the selected series of voltage-offset samples to produce respective third, fourth, fifth, and sixth series of voltage-offset samples;

means for sampling each of the third, fourth, fifth, and sixth series of offset samples to produce third, fourth, fifth, and sixth series of digital samples; and means for selecting between the third, fourth, fifth, and sixth series of digital samples responsive to the equalized digital samples.

19. The receiver of claim 16, further comprising adaptation means for deriving the first voltage offset and the second voltage offset from the series of equalized digital samples.

20. The receiver of claim 19, further comprising means for sampling the series of analog samples to produce error samples and deriving the first voltage offset and the second voltage offset from the error samples.

* * * * *